(12) United States Patent
Nowosielski et al.

(10) Patent No.: US 10,763,918 B1
(45) Date of Patent: Sep. 1, 2020

(54) TIME SYNCHRONIZATION OF BOTTOM HOLE ASSEMBLY COMPONENTS VIA POWERLINE COMMUNICATION

(71) Applicants: Rochus Rafael Nowosielski, Hannover (DE); Gerald Hinrichs, Eldingen (DE)

(72) Inventors: Rochus Rafael Nowosielski, Hannover (DE); Gerald Hinrichs, Eldingen (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/436,208

(22) Filed: Jun. 10, 2019

(51) Int. Cl.
*H04L 25/02* (2006.01)
*H04B 3/54* (2006.01)
*E21B 47/12* (2012.01)

(52) U.S. Cl.
CPC .............. *H04B 3/542* (2013.01); *E21B 47/12* (2013.01); *H04B 3/546* (2013.01); *H04B 3/548* (2013.01); *H04B 2203/5416* (2013.01); *H04L 25/0226* (2013.01)

(58) Field of Classification Search
USPC ........................................................ 702/89
See application file for complete search history.

(56) References Cited

U.S. PATENT DOCUMENTS

| | | | |
|---|---|---|---|
| 7,352,770 B1 | 4/2008 | Yonge, III et al. | |
| 8,537,705 B2 | 9/2013 | Afkhamie et al. | |
| 8,718,115 B2 | 5/2014 | Dabak et al. | |
| 8,805,632 B2 * | 8/2014 | Coman | G01V 11/002 702/1 |
| 8,837,606 B2 | 9/2014 | Reves Balleste et al. | |
| 9,136,908 B2 | 9/2015 | Vijayasankar et al. | |
| 9,683,438 B2 | 6/2017 | Fanini et al. | |
| 9,749,252 B2 | 8/2017 | Katar et al. | |
| 2015/0071364 A1 | 3/2015 | Batra et al. | |
| 2016/0259032 A1 * | 9/2016 | Hehn | G01S 5/0289 |
| 2016/0326867 A1 * | 11/2016 | Prammer | E21B 17/003 |
| 2017/0359263 A1 * | 12/2017 | Barghi | H04B 17/309 |
| 2018/0013524 A1 * | 1/2018 | Chien | H04W 48/14 |

OTHER PUBLICATIONS

IEEE, 1901.2-2013—"IEEE Standard for Low-Frequency (less than 500 kHz) Narrowband Power Line Communications for Smart Grid Applications,"; https://ieeexplore.ieee.org/servlet/opac?punumber=6679208; p. 133, paragraphs 1-4; Published: Dec. 6, 2013, Electronic ISBN: 978-0-7381-8793-8, 2 pgs.

* cited by examiner

*Primary Examiner* — Eva Y Puente
(74) *Attorney, Agent, or Firm* — Cantor Colburn LLP

(57) ABSTRACT

An example method for performing a time synchronization among a plurality of electronic components within a bottom hole assembly (BHA) includes modifying a preamble of a digital signal by adding symbols to the preamble of the digital signal to mark a moment in time. The method further includes generating a physical waveform that includes the modified preamble and transmitting the physical waveform over a powerline, using a powerline interface, to other of the plurality of electronic components. The method further includes transmitting an absolute time value to the other of the other of the plurality of electronic components. The method further includes performing, by at least one of the other of the plurality of electronic components, the time synchronization by detecting the physical waveform, determining a local time drift compared to the moment in time and the absolute time value, and adjusting a local clock to the absolute time value.

15 Claims, 6 Drawing Sheets

TIME SYNCHRONIZATION OF BOTTOM HOLE ASSEMBLY COMPONENTS VIA POWERLINE COMMUNICATION

BACKGROUND

Embodiments described herein relate generally to downhole exploration and production efforts and more particularly to techniques for performing time synchronization of bottom hole assemblies via powerline communication.

Downhole exploration and production efforts involve the deployment of a variety of sensors and tools. The sensors provide information about the downhole environment, for example, by collecting data about temperature, density, saturation, and resistivity, among many other parameters. This information can be used to control aspects of drilling and tools or systems located in the bottom hole assembly, along the drillstring, or on the surface.

SUMMARY

According to one embodiment of the present disclosure, a method for performing time synchronization among electrical components of a bottom hole assembly are disclosed. The method includes modifying a preamble of a digital signal by adding additional symbols to the preamble of the digital signal to mark a moment in time. The method further includes generating a physical waveform that includes the modified preamble. The method further includes transmitting the physical waveform over a powerline, using a powerline interface, to other of the plurality of electronic components. The method further includes transmitting an absolute time value to the other of the other of the plurality of electronic components. The method further includes performing, at least one of the other of the plurality of electronic components, the time synchronization by detecting the physical waveform, determining a local time drift compared to the moment in time and the absolute time value, and adjusting a local clock to the absolute time value to account for the local time drift.

According to another embodiment of the present disclosure, a system is disclosed that includes performing a time synchronization among electronic components within a bottom hole assembly (BHA). a first electronic component within the BHA to generate a signal. The system further includes a first transceiver to receive the signal from the first BHA component and convert the signal into a digital signal. The system further includes a field programmable gate array (FPGA) to send a synchronization message, the synchronization message being a dedicated synchronization message or a modified synchronization message generated by modifying a preamble of the digital signal, when the FPGA is operating in a preamble modifier mode, by adding additional symbols to the preamble of the digital signal to mark a moment in time. The system further includes a second transceiver to generate a physical waveform of the synchronization message. The system further includes a powerline interface to transmit the physical waveform over a powerline. The system further includes a second electronic component within the BHA to receive the physical waveform via the powerline and to perform the time synchronization by detecting the physical waveform, determining a local time drift compared to the moment in time, and adjusting a local clock to account for the local time drift.

BRIEF DESCRIPTION OF THE DRAWINGS

Referring now to the drawings wherein like elements are numbered alike in the several figures.

DETAILED DESCRIPTION

Modern bottom hole assemblies (BHAs) are composed of several distributed components, such as sensors and tools, with each component performing data acquisition and/or processing of a special purpose. These components are connected to a common powerline, which is used to power the components and to facilitate high-speed communication by implementing orthogonal frequency-division multiplexing-based powerline transceivers.

Currently, time synchronization between components inside a BHA is implemented at a software level. This causes the problem that time synchronization packets sent over the powerline need to be processed by processors which execute among others the synchronization application implemented in software. Software-based time synchronization introduces a delay caused by processor interrupts, queue handling, memory access, etc. This delay is non-deterministic. Consequently, currently achievable time synchronization precision throughout the BHA using software-based time synchronization is in the range of 10-100 milliseconds. This delay is too extensive for applications with distributed components throughout the BHA because data and associated timestamps are not coherent throughout the BHA.

The embodiments described herein provide a technical solution to the software-based time synchronization uncertainty problem. In particular, the techniques described herein are directed to hardware-based time synchronization among the components of the BHA over powerline communication. According to one or more embodiments described herein, powerline communication can conform to the HomePlug 1.0 standard or another suitable standard, such as Green PHY, HomePlug AV, etc.

According to the here presented techniques, hardware-based time synchronization is provided. In examples, components within the BHA include a powerline transceiver that has direct access to the physical powerline. Accordingly, these transceivers can observe the physical events (i.e., signals) on this powerline. A primary time source implemented inside a powerline transceiver can emit a modified preamble once per defined time interval. Synchronization units inside the receiving transceivers wait for this periodic events and measure their local time drift between these events. Once at least two events have occurred, the receiving transceivers detect this local time drift and adjust their local clocks to account for the time drift. These clocks are based on oscillators, so in general, the period of the local time oscillator is the achievable precision of time synchronization. For example, assuming a 10 MHz local oscillator, the achievable precision is approximately 100 nanoseconds, which represents a significant technical improvement over software-based time synchronization as described herein.

Figure 1:
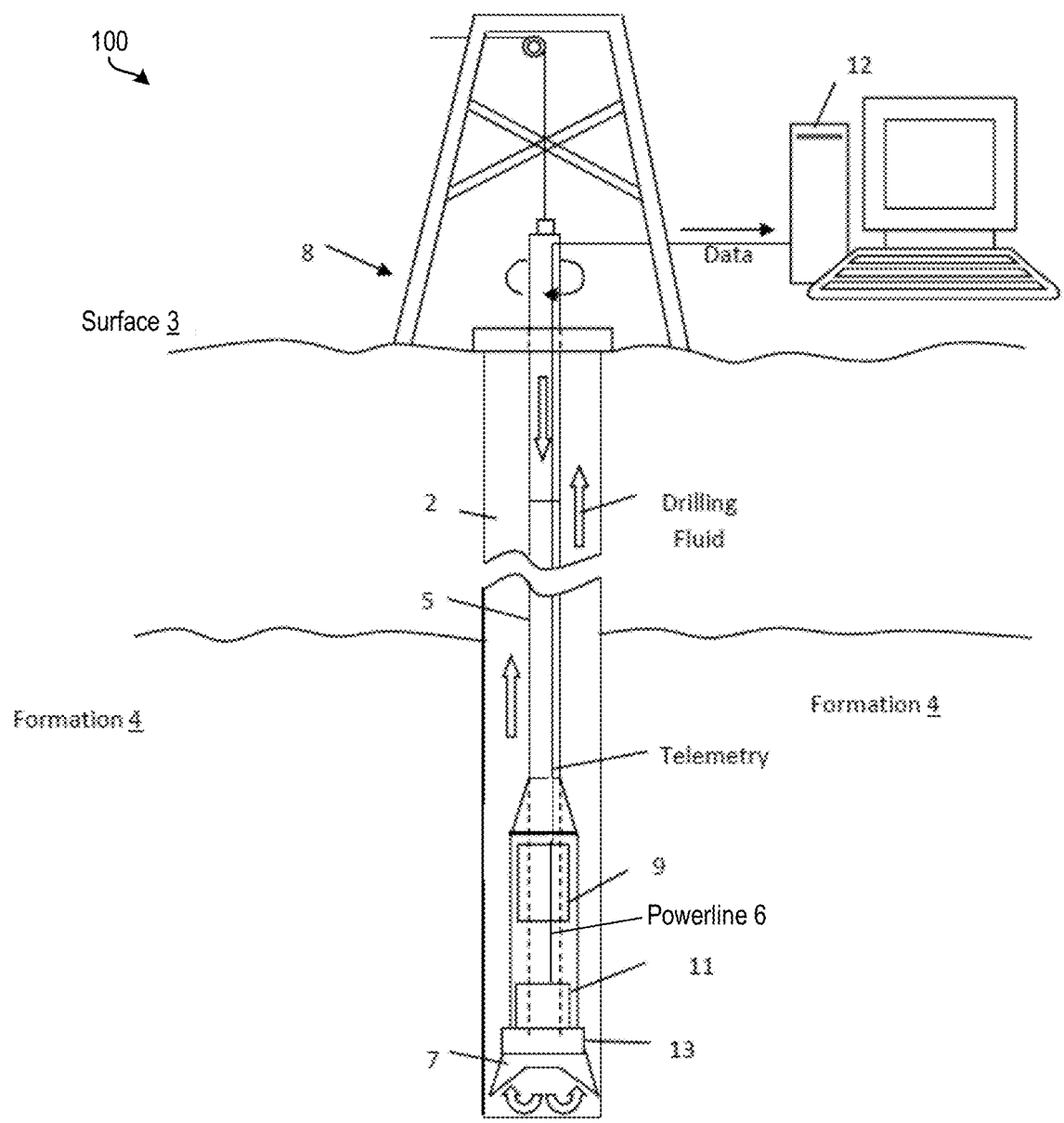
FIG. 1 depicts a cross-sectional view of a downhole system according to one or more embodiments described herein.

Wellbores are drilled into a subsurface to produce hydrocarbons and for other purposes. In particular, FIG. 1 depicts a cross-sectional view of a wellbore operation 100, according to aspects of the present disclosure. In traditional wellbore operations, logging-while-drilling (LWD) measurements are conducted during a drilling operation to determine formation rock and fluid properties of the formation 4. Those properties are then used to for various purposes such as estimating reserves from saturation logs, defining completion setups etc. as described herein.

The system and arrangement shown in FIG. 1 is one example to illustrate the downhole environment. While the system can operate in any subsurface environment, FIG. 1 shows a carrier 5 disposed in a borehole 2 penetrating the formation 4. The carrier 5 is disposed in the borehole 2 at a distal end of a carrier 5, as shown in FIG. 1.

According to the LWD/MWD embodiment, the carrier 5 is a drill string that includes a bottom hole assembly (BHA) 13. The BHA 13 is a part of the drilling rig 8 that includes drill collars, stabilizers, reamers, and the like, and the drill bit 7. The BHA 13 also includes sensors (e.g., measurement tools 11) and electronic components (e.g., downhole electronic components 9). The measurements collected by the measurement tools 11 can include measurements related to drill string operation, for example. A drilling rig 8 is configured to conduct drilling operations such as rotating the drill string and, thus, the drill bit 7. The drilling rig 8 also pumps drilling fluid through the drill string in order to lubricate the drill bit 7 and flush cuttings from the borehole 2. The measurement tools 11 and downhole electronic components 9 are configured to perform one or more types of measurements in an embodiment known as Logging-While-Drilling (LWD) or Measurement-While-Drilling (MWD) according to one or more embodiments described herein.

Raw data is collected by the measurement tools 11 and transmitted to the downhole electronic components 9 for processing. The data can be transmitted between the measurement tools 11 and the downhole electronic components 9 by a powerline 6, which transmits power and data between the measurement tools 11 and the downhole electronic components 9. Power is generated downhole by a turbine-generation combination (not shown), and communication to the surface 3 (e.g., to the system 12) is cable-less (e.g., using mud pulse telemetry, electromagnetic telemetry, etc.) and/or cable-bound (e.g., using a cable to the system 12). The data processed by the downhole electronic components 9 can then be telemetered to the surface for additional processing or display by a processing system 12.

Drilling control signals can be generated by the processing system 12 and conveyed downhole or can be generated within the downhole electronic components 9 or by a combination of the two according to embodiments of the present disclosure. The downhole electronic components 9 and the processing system 12 can each include one or more processors and one or more memory devices. In alternate embodiments, computing resources such as the downhole electronic components 9, sensors, and other tools can be located along the carrier 5 rather than being located in the BHA 13, for example. The borehole 2 can be vertical as shown or can be in other orientations/arrangements.

Figure 2:
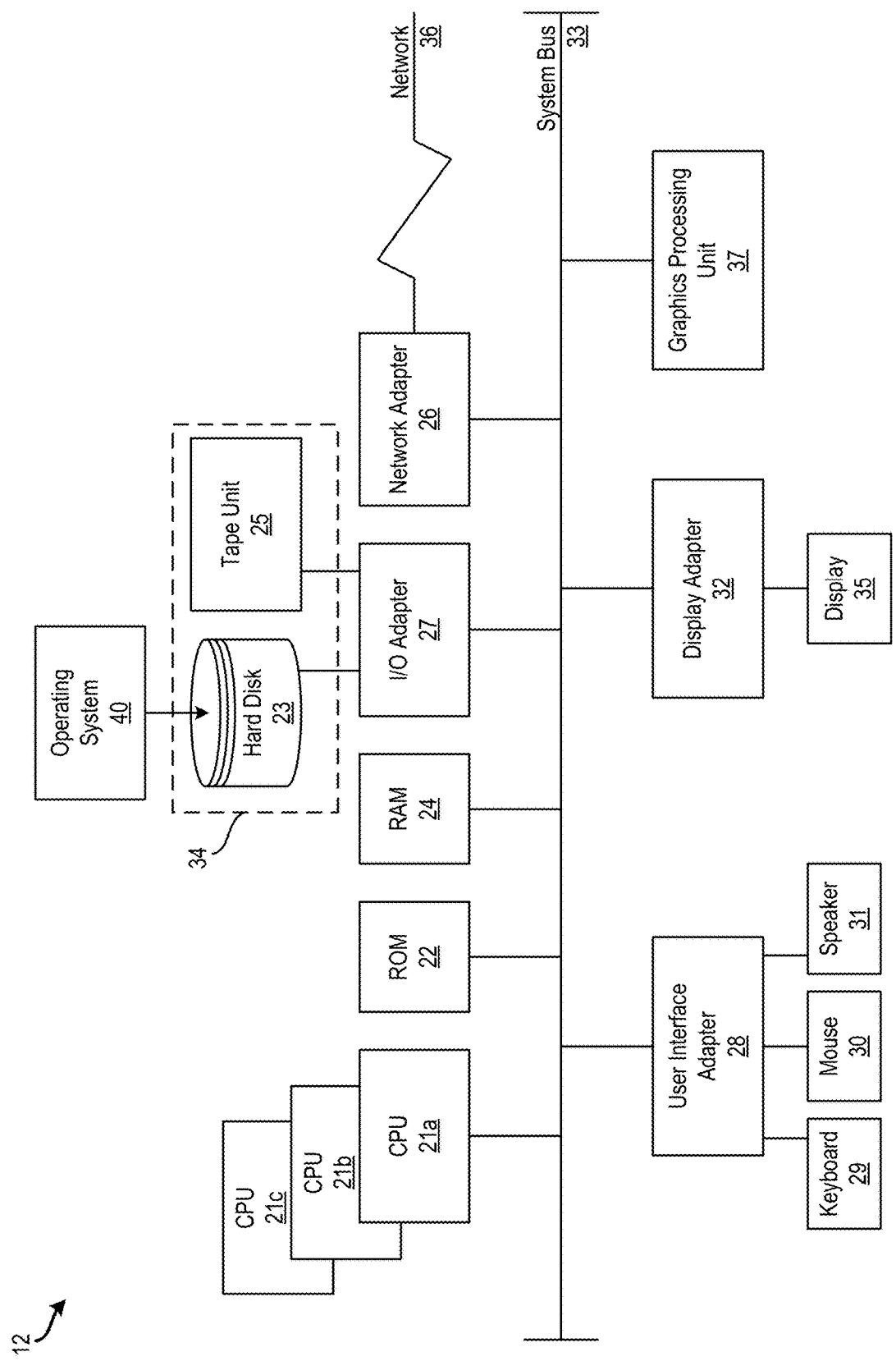
FIG. 2 depicts a block diagram of the processing system of FIG. 1, which can be used for implementing the present techniques herein according to one or more embodiments described herein.

It is understood that embodiments of the present disclosure are capable of being implemented in conjunction with any other suitable type of computing environment now known or later developed. For example, FIG. 2 depicts a block diagram of the processing system 12 of FIG. 1, which can be used for implementing the techniques described herein. In examples, processing system 12 has one or more central processing units (processors) 21a, 21b, 21c, etc. (collectively or generically referred to as processor(s) 21 and/or as processing device(s)). In aspects of the present disclosure, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 12.

Further illustrated are an input/output (I/O) adapter 27 and a network adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 12 can be stored in mass storage 34. The network adapter 26 interconnects system bus 33 with an outside network 36 enabling processing system 12 to communicate with other such systems.

A display (e.g., a display monitor) 35 is connected to system bus 33 by display adaptor 32, which can include a graphics adapter to improve the performance of graphics intensive applications and a video controller. In one aspect of the present disclosure, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

In some aspects of the present disclosure, processing system 12 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 12 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 12.

Figure 3:
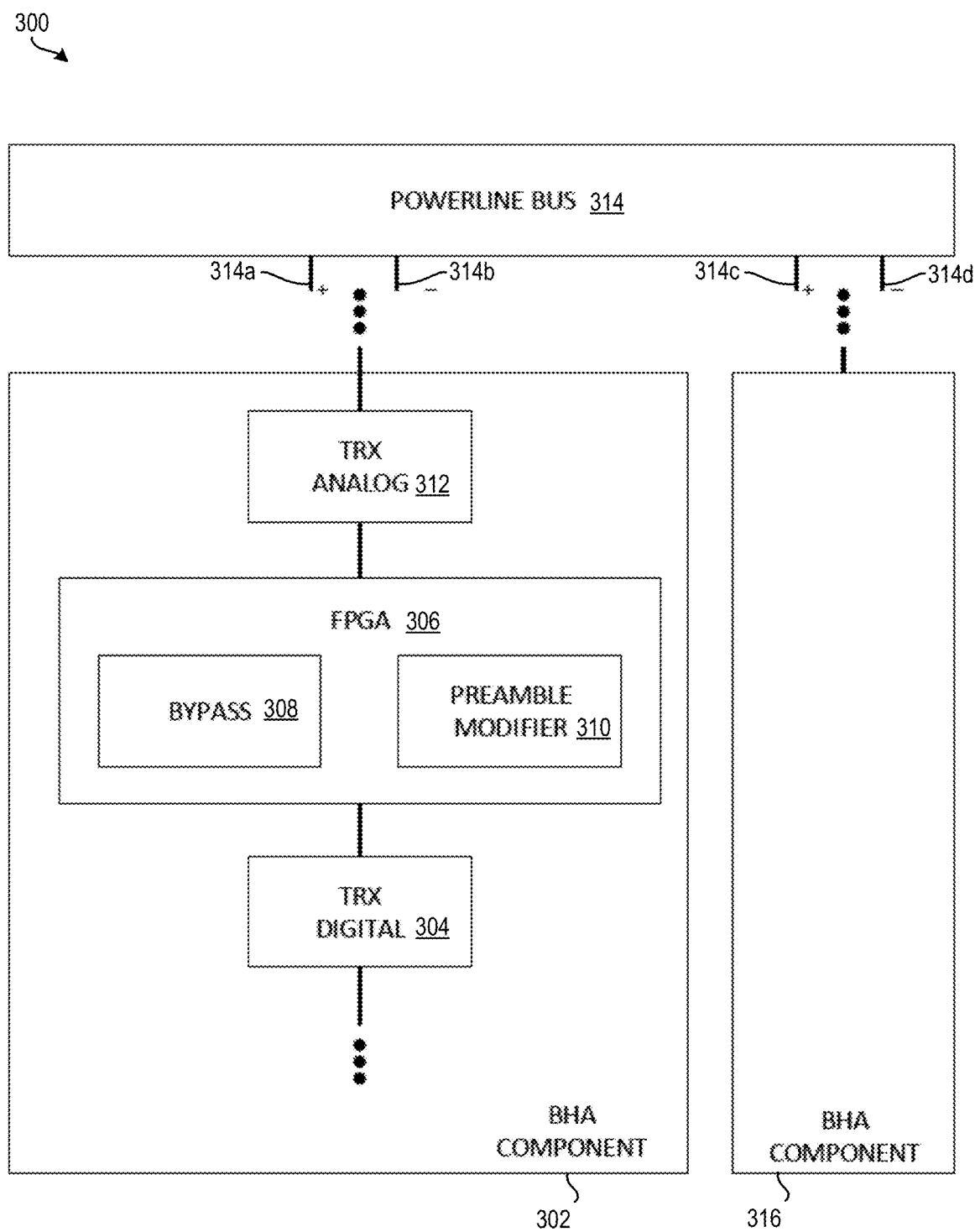
FIG. 3 depicts a block diagram of a system for time synchronization of BHA components using a field programmable gate array according to one or more embodiments described herein.

FIG. 3 depicts a block diagram of a system 300 for time synchronization of BHA components 302, 316 using a field programmable gate array (FPGA) 306 according to one or more embodiments described herein. It should be appreciated that an FPGA is shown for exemplary purposes but that other electronic components can be used as well, such as a specialized integrated circuit, a microprocessor, an application-specific integrated circuit (ASIC), and the like. In the example of FIG. 3, the FPGA 306 can operate in at least two modes: a bypass mode and a preamble modifier mode. In some examples, the FPGA 306 operates in the preamble modifier mode without a bypass mode.

The BHA components 302, 316 are communicatively coupled to enable the BHA components 302, 316 to communicate with one another (and with other components). In the example of FIG. 3, the BHA component 302 is considered a "sender" that sends (transmit) a message and the BHA component 316 is considered a "receiver" that receives the message. However, it should be appreciated the BHA components 302, 316 can be senders and receivers such that each of the BHA components 302, 316 can both send and receive messages.

According to one or more embodiments described herein, the BHA component 302 can be a digital signal processor (DSP) and represents one or more measurement tools 11. The BHA component 316 can also be a DSP and represents one or more of the downhole electronic components.

The BHA component 302 collects data and transmits the data via a signal to the BHA component 316. In particular, the BHA component 302 transmits a digital signal to a digital transceiver ("TRX digital") 304, which can be part of the BHA component 302 or a separate component, and the digital transceiver 304 converts the digital signal into data packages according to the used standard (e.g., Homeplug 1.0). The data package is transmitted to the analog transceiver ("TRX analog") 312, which converts the data package into an analog signal to be transmitted over a powerline by a powerline interface 314. According to one or more embodiments described herein, the digital transceiver 304 and the analog transceiver 312 operate together to form a powerline transceiver. A powerline bus 314 includes a first positive lead 314a and a first negative lead 314b, which are connected to the BHA component 302 (specifically to the analog transceiver 312). The powerline also includes a second positive lead 314c and a second negative lead 314d, which are connected to the BHA component 316. The powerline carries both power and data signals so that no additional wire is needed for time synchronization. Moreover, the time synchronization techniques described herein 'lives' inside the powerline communication, and does not disturb powerline communication in general.

An electronic component (e.g. FPGA) 306 is disposed between the digital transceiver 304 and the analog transceiver 312 to intercept the data package transmitted between the respective digital transceiver 304 and analog transceiver 312 and to either bypass the data package or modify a preamble of the data package. In particular, the FPGA 306 operates in one of the bypass mode or the preamble modify mode. In the bypass mode, the FPGA 306 routes the data package from the digital transceiver 304 through a bypass 308, which passes the data package, unmodified, on to the analog transceiver 312. In the preamble modify mode, the FPGA 306 routes the data package from the digital transceiver 304 through a preamble modifier 310, which modifies the preamble of the data package then passes the modified data package on to the analog transceiver 312. The FPGA 306 may enter the preamble modify mode at a predetermined time, which can occur periodically, to mark that predetermined time for time synchronization.

According to one or more embodiments described herein, the FPGA 306 sends a synchronization message, which can be one of a dedicated synchronization message or a modified synchronization message generated by modifying a preamble of a digital signal generated by an electronic component within the BHA.

Figure 4A:
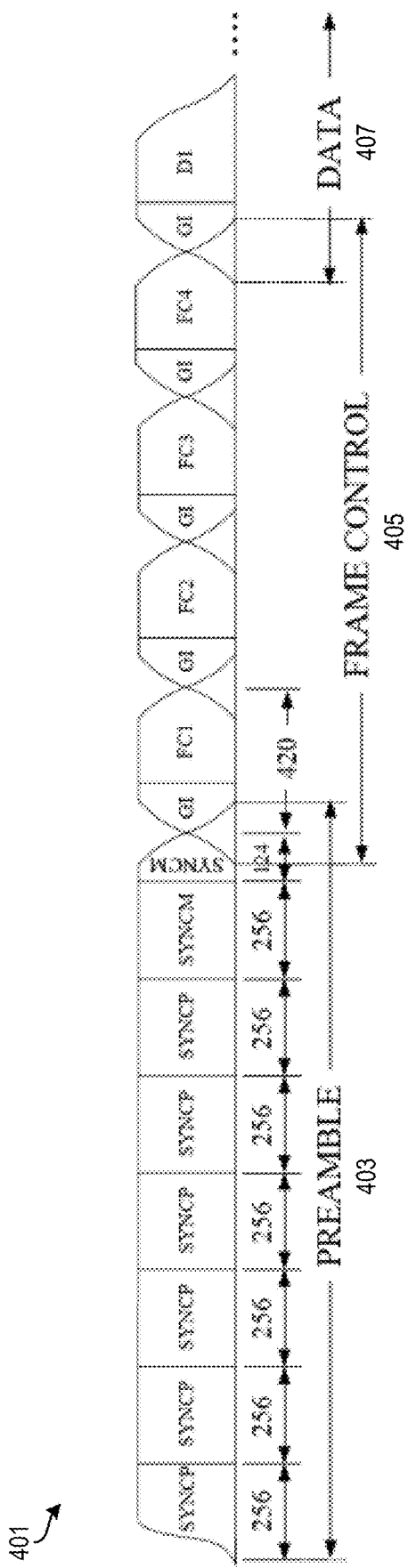
FIG. 4A depicts an unmodified digital signal according to one or more embodiments described herein.

FIG. 4A depicts an example of an data package according to Homeplug 1.0 standard 401 transmitted by the transceiver 304 according to one or more embodiments described herein. The unmodified data package 401 includes a preamble 403, a frame control portion 405, and a data portion 407. The unmodified data package 401 conforms to a communication standard known as the HomePlug standard. As shown in FIG. 4A, the preamble 403 can include six 256-bit blocks of data, referred to as "SYNCP" symbols, and a single 256-bit ending block of data, referred to as a "SYNCM" signal that designates the end of the preamble 403. The SYNCM signal is a modulated form of the SYNCP signal.

Figure 4B:
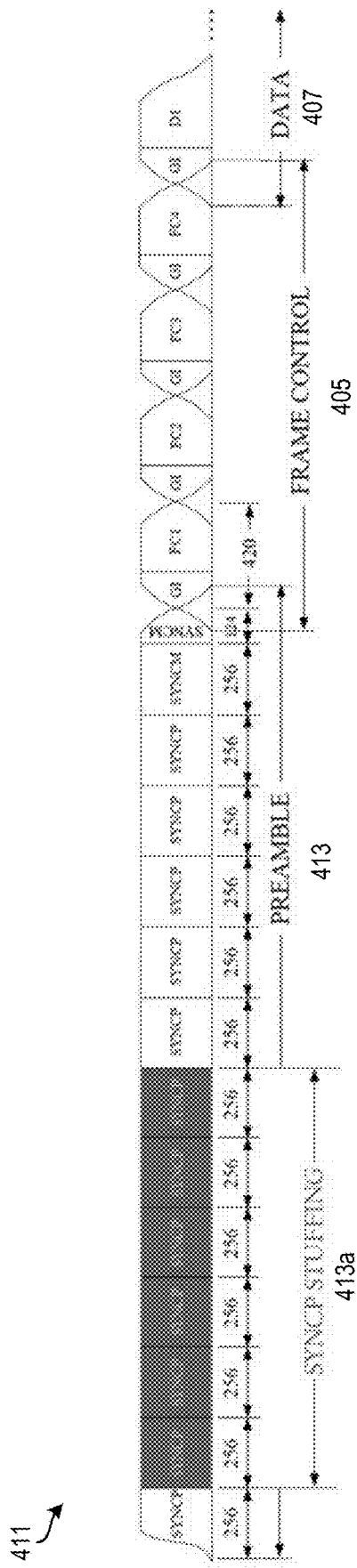
FIG. 4B depicts a modified digital signal according to one or more embodiments described herein.

FIG. 4B depicts a modified data package 411 according to one or more embodiments described herein. In this example, the unmodified data package 401 is modified by adding additional SYNCP symbols 413a into the preamble 403 to generate a modified preamble 413. The modified data package 411 includes the modified preamble 413, the frame control portion 405, and the data portion 407. The modified preamble 413 enables time synchronization to be performed among electronic components. According to one or more embodiments described herein, the modified preamble 413 does not conform to the Home Plug standard. In this way, the modified preamble 413 is distinct from the unmodified preamble 403 because the unmodified preamble 403 is expected to have a specific format (e.g., a specific number of SYNCP symbols) and the modified preamble 413 differs in this aspect (e.g., it has a different number of SYNCP symbols).

The time synchronization is performed using the modified data package 411 as follows. The BHA component 316 expects to receive the modified data package 411 with the modified preamble 413 at a particular, predefined time, which can occur once, periodically, on-demand, etc. After the BHA component 302 sends the modified data package, via normal communication it announces its absolute time value at the time of sending the modified data package (e.g., 10:32.123456). The BHA component 316, which acts as the receiver of the modified data package, takes its local time at the arrival of the modified data package, waits for the communication of the absolute time value from the BHA component 302, and corrects a local clock of the BHA component 316 for any variance/drift. Once two synchronization events have been received, the BHA component 316 calculates the time drift of a local clock (not shown) of the BHA component 316. The BHA component 316 can then adjust its local clock to account for the measured time drift. Generally, the local clock can be an oscillator or another hardware-based clock. In yet another example, the local clock of the BHA component 316 can be periodically adjusted. Moreover, local clock precision can be further increased using periodic adjustment of the local clock along with continuous compensation of the local clock speed. According to one or more embodiments described herein, the period of the local clock is the achievable precision of time synchronization. For example, a 10 MHz oscillator (local clock) has an achievable precision of around 100 nanoseconds.

Topology and distance between the BHA component 302 and the BHA component 316 can be corrected to achieve higher local precision. For example, local oscillators within the BHA components 302, 316 can compensate their individual drift and stay within a tolerance of one oscillation period (e.g., 62.5 ns of a 16 MHz oscillator).

Figure 5:
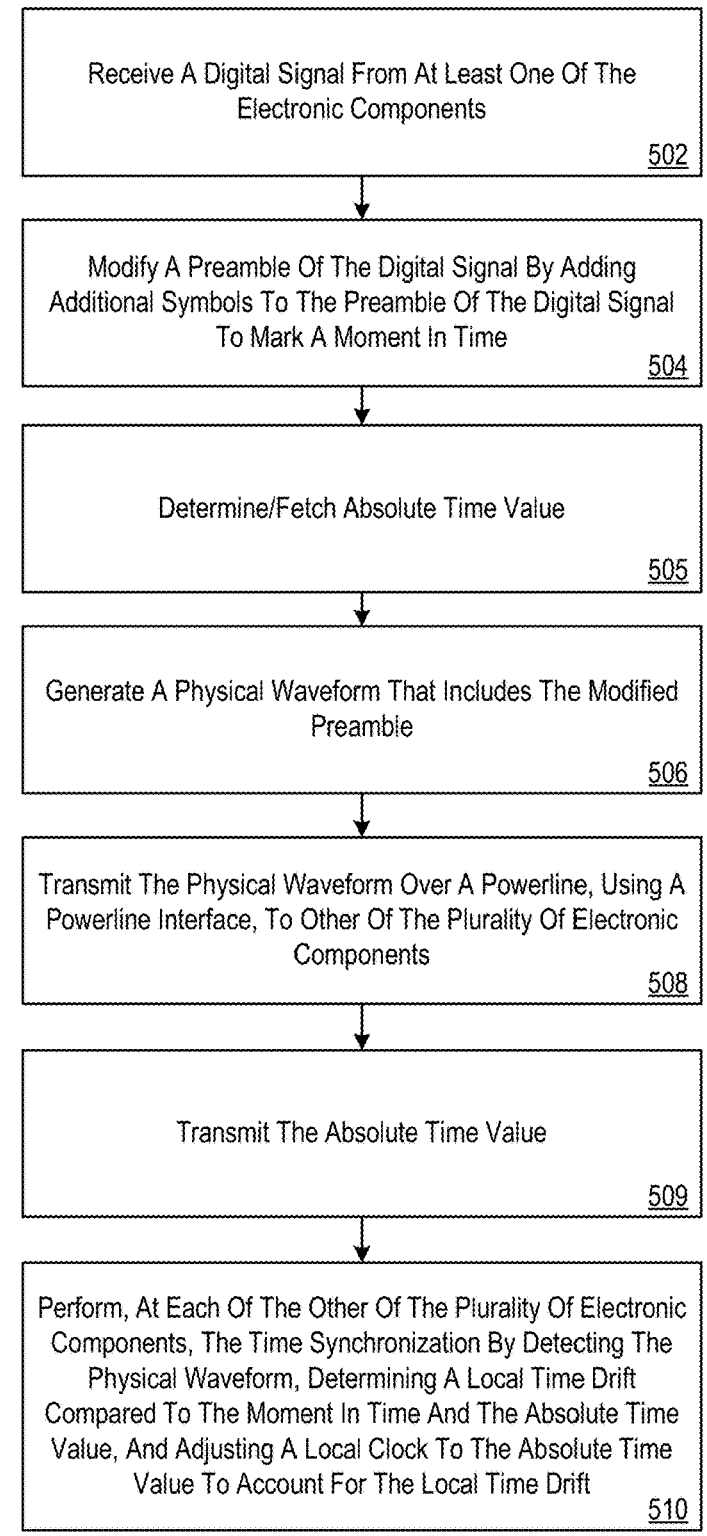
FIG. 5 depicts a flow diagram of a method for performing time synchronization of BHA components according to one or more embodiments described herein.

FIG. 5 depicts a flow diagram of a method 500 for performing time synchronization of BHA components according to one or more embodiments described herein. The method 500 is described from the perspective of a sending device (e.g., the BHA component 302).

At block 502, the FPGA 306 receives a digital signal from at least one of the electronic components (e.g., the BHA component 302) via a transceiver (e.g., the digital transceiver 304). At block 504, the FPGA 306 modifies a preamble of the digital signal by adding additional symbols to the preamble of the digital signal to mark a moment in time. At block 505, the FPGA 306 determines (or fetches) an absolute time value. At block 506, the transceiver 312 generates a physical waveform that includes the modified preamble. At block 508, the analog transceiver 312 transmits the physical waveform over a powerline, using the interface 314, to other of the plurality of electronic components (e.g., the BHA component 316) via a powerline. At block 509, the analog transceiver 312 transmits the absolute time value. At block 510, the other electronic components (e.g., the BHA component 316) performs the time synchronization by detecting the physical waveform on the powerline, determining a local time drift compared to the marked moment in time and the absolute time value, and adjusting a local clock to the absolute time to account for the local time drift.

Additional processes also can be included, and it should be understood that the processes depicted in FIG. 5 represent illustrations and that other processes can be added or existing processes can be removed, modified, or rearranged without departing from the scope and spirit of the present disclosure.

Figure 6:
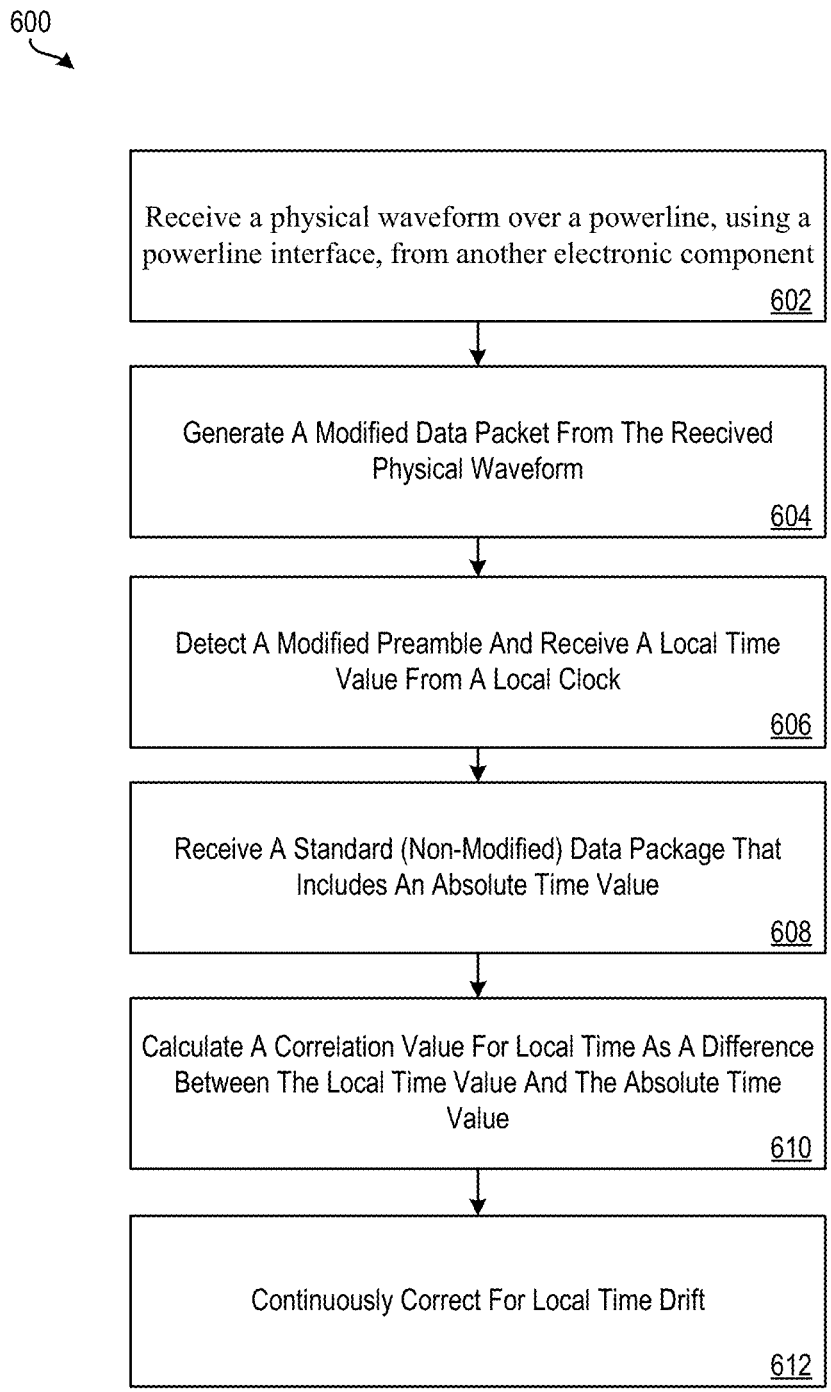
FIG. 6 depicts a flow diagram of a method for performing time synchronization of BHA components according to one or more embodiments described herein.

FIG. 6 depicts a flow diagram of a method 600 for performing time synchronization of BHA components according to one or more embodiments described herein. The method 600 is described from the perspective of a receiving device (e.g., the BHA component 316).

At block 602, the BHA component 316 receives a physical waveform over a powerline, using a powerline interface (e.g., the powerline bus 314), from another electronic component (e.g., the BHA component 302). At block 604, the BHA component 302 generates a modified data packet from the received physical waveform, such as using analog-to-digital conversion. At block 606, the BHA component 316 detects a modified preamble and receives a local time value from a local clock, the local clock being local to the BHA component 316. At block 608, the BHA component 316 receives a standard (non-modified) data package from the BHA component 302 that includes an absolute time value (such as from a third-party master time keeper, from a clock at the BHA component 302 used as a master clock, etc.). At block 610, the BHA component 316 calculates a correction value for local time as a difference between the local time value and the absolute time value. In one or more embodiments, the method 600 further includes, at block 612, after two or more synchronization packages have been received, the local time drift can be calculated and local time can be continuously corrected for the local time drift. A synchronization package include the modified data package and the non-modified data package that includes the absolute time value.

Additional processes also can be included, and it should be understood that the processes depicted in FIG. 6 represent illustrations and that other processes can be added or existing processes can be removed, modified, or rearranged without departing from the scope and spirit of the present disclosure.

Example embodiments of the disclosure include or yield various technical features, technical effects, and/or improvements to technology. Example embodiments of the disclosure provide technical solutions for improving time synchronization between electrical components communicating via powerline. In particular, the technical solutions described herein modify a preamble of a digital signal by adding additional symbols to the preamble of a digital signal to mark a moment in time, and time synchronizing is performed by determining a local time drift as compared to the moment in time and then adjusting a local clock (e.g., an oscillator) to account for the local time drift. These aspects of the disclosure constitute technical features that yield the technical effect of providing more precise time synchronization between electronic components communicating via powerline. As a result of these technical features and technical effects, techniques in accordance with example embodiments of the disclosure represents an improvement to existing time synchronization techniques. For example, traditional time synchronization achieves a precision of approximately 100 milliseconds, while the hardware-based time synchronization described herein improves precision to approximately 100 nanoseconds. This improvement in precision of time synchronization represents an improvement to powerline communications between electronic components and thereby represents an improvement to computer functionality. It should be appreciated that the above examples of technical features, technical effects, and improvements to technology of example embodiments of the disclosure are merely illustrative and not exhaustive.

Set forth below are some embodiments of the foregoing disclosure:

Embodiment 1

A method for performing a time synchronization among a plurality of electronic components within a bottom hole assembly (BHA), the method comprising: modifying a preamble of a digital signal by adding additional symbols to the preamble of the digital signal to mark a moment in time; generating a physical waveform that includes the modified preamble; transmitting the physical waveform over a powerline, using a powerline interface, to other of the plurality of electronic components; transmitting an absolute time value to the other of the other of the plurality of electronic components; and performing, by at least one of the other of the plurality of electronic components, the time synchronization by detecting the physical waveform, determining a local time drift compared to the moment in time and the absolute time value, and adjusting a local clock to the absolute time value to account for the local time drift.

Embodiment 2

A method according to any prior embodiment, wherein modifying the preamble of the digital signal is performed by one of the group consisting of a field programmable gate array, an application-specific integrated circuit, a microprocessor, and a specialized integrated circuit.

Embodiment 3

A method according to any prior embodiment, wherein at least one of the plurality of electronic components within the BHA is a measurement tool, and wherein at least one of the plurality of electronic components within the BHA is a downhole electronic component.

Embodiment 4

A method according to any prior embodiment, wherein the local clock is an oscillator.

Embodiment 5

A method according to any prior embodiment, wherein an achievable precision of the time synchronization is based at least in part on a period of the oscillator.

Embodiment 6

A method according to any prior embodiment, wherein modifying the preamble occurs at periodic intervals.

Embodiment 7

A method according to any prior embodiment, wherein each of the plurality of electronic components within the BHA are communicatively coupled together via the powerline.

Embodiment 8

A method according to any prior embodiment, wherein the preamble of the digital signal comprises six SYNCP symbols and one SYNCM signal, and wherein the modified preamble of the digital signal comprises more than six SYNCP symbols and one SYNCM symbol.

Embodiment 9

A method according to any prior embodiment, wherein the preamble of the digital signal conforms to a communication standard, and wherein the modified preamble of the digital signal does not conform to the communication standard.

Embodiment 10

A method according to any prior embodiment, wherein the communication standard is a HomePlug communication standard.

Embodiment 11

A method according to any prior embodiment, wherein the powerline carries power signals and data signals.

Embodiment 12

A system for performing a time synchronization among electronic components within a bottom hole assembly (BHA), the system comprising: a first electronic component within the BHA to generate a signal; a first transceiver to receive the signal from the first BHA component and convert the signal into a digital signal; a field programmable gate array (FPGA) to send a synchronization message, the synchronization message being a dedicated synchronization message or a modified synchronization message generated by modifying a preamble of the digital signal, when the FPGA is operating in a preamble modifier mode, by adding additional symbols to the preamble of the digital signal to mark a moment in time; a second transceiver to generate a physical waveform of the synchronization message; a powerline interface to transmit the physical waveform over a powerline; and a second electronic component within the BHA to receive the physical waveform via the powerline and to perform the time synchronization by detecting the physical waveform, determining a local time drift compared to the moment in time, and adjusting a local clock to account for the local time drift Embodiment 13

A system according to any prior embodiment, wherein, when the FPGA is operating in a bypass mode, the FPGA routes the digital signal from the first transceiver to the second transceiver without modifying the preamble of the digital signal.

Embodiment 14

A system according to any prior embodiment, wherein the FPGA enters the preamble modifier mode at a predetermined time.

Embodiment 15

A system according to any prior embodiment, wherein the preamble of the digital signal comprises six SYNCP symbols and one SYNCM signal, and wherein the modified preamble of the digital signal comprises twelve SYNCP symbols and one SYNCM symbol.

The use of the terms "a" and "an" and "the" and similar referents in the context of describing the present disclosure (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure can be used in a variety of well operations. These operations can involve using one or more treatment agents to treat a formation, the fluids resident in a formation, a wellbore, and/or equipment in the wellbore, such as production tubing. The treatment agents can be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the present disclosure has been described with reference to an exemplary embodiment or embodiments, it will be understood by those skilled in the art that various changes can be made and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A method for performing a time synchronization among a plurality of electronic components within a bottom hole assembly (BHA), the method comprising:
    modifying a preamble of a digital signal by adding additional symbols to the preamble of the digital signal to mark a moment in time;
    determining an absolute time value;
    generating a physical waveform that includes the modified preamble;
    transmitting the physical waveform over a powerline, using a powerline interface, to other of the plurality of electronic components;
    transmitting the absolute time value to the other of the plurality of electronic components; and
    performing, by at least one of the other of the plurality of electronic components, the time synchronization by detecting the physical waveform, determining a local time drift compared to the moment in time and the absolute time value, and adjusting a local clock to the absolute time value to account for the local time drift.

2. The method of claim 1, wherein modifying the preamble of the digital signal is performed by one of the group consisting of a field programmable gate array, an application-specific integrated circuit, a microprocessor, and a specialized integrated circuit.

3. The method of claim 1, wherein at least one of the plurality of electronic components within the BHA is a measurement tool, and wherein at least one of the plurality of electronic components within the BHA is a downhole electronic component.

4. The method of claim 1, wherein the local clock is an oscillator.

5. The method of claim 4, wherein an achievable precision of the time synchronization is based at least in part on a period of the oscillator.

6. The method of claim 1, wherein modifying the preamble occurs at periodic intervals.

7. The method of claim 1, wherein each of the plurality of electronic components within the BHA are communicatively coupled together via the powerline.

8. The method of claim 1, wherein the preamble of the digital signal comprises six SYNCP symbols and one SYNCM signal, and wherein the modified preamble of the digital signal comprises more than six SYNCP symbols and one SYNCM symbol.

9. The method of claim 1, wherein the preamble of the digital signal conforms to a communication standard, and wherein the modified preamble of the digital signal does not conform to the communication standard.

10. The method of claim 9, wherein the communication standard is a HomePlug communication standard.

11. The method of claim 1, wherein the powerline carries power signals and data signals.

12. A system for performing a time synchronization among electronic components within a bottom hole assembly (BHA), the system comprising:
    a first electronic component within the BHA to generate a signal;
    a first transceiver to receive the signal from the first BHA component and convert the signal into a digital signal;
    a field programmable gate array (FPGA) to send a synchronization message, the synchronization message being a modified synchronization message generated by modifying a preamble of the digital signal, responsive to the FPGA operating in a preamble modifier mode, by adding additional symbols to the preamble of the digital signal to mark a moment in time;
    a second transceiver to generate a physical waveform of the synchronization message;
    a powerline interface to transmit the physical waveform over a powerline; and
    a second electronic component within the BHA to receive the physical waveform via the powerline and to perform the time synchronization by detecting the physical waveform, determining a local time drift compared to the moment in time, and adjusting a local clock to account for the local time drift.

13. The system of claim 12, wherein, when the FPGA is operating in a bypass mode, the FPGA routes the digital signal from the first transceiver to the second transceiver without modifying the preamble of the digital signal.

14. The system of claim 12, wherein the FPGA enters the preamble modifier mode at a predetermined time.

15. The system of claim 12, wherein the preamble of the digital signal comprises six SYNCP symbols and one SYNCM signal, and wherein the modified preamble of the digital signal comprises twelve SYNCP symbols and one SYNCM symbol.

* * * * *